Figure 1:
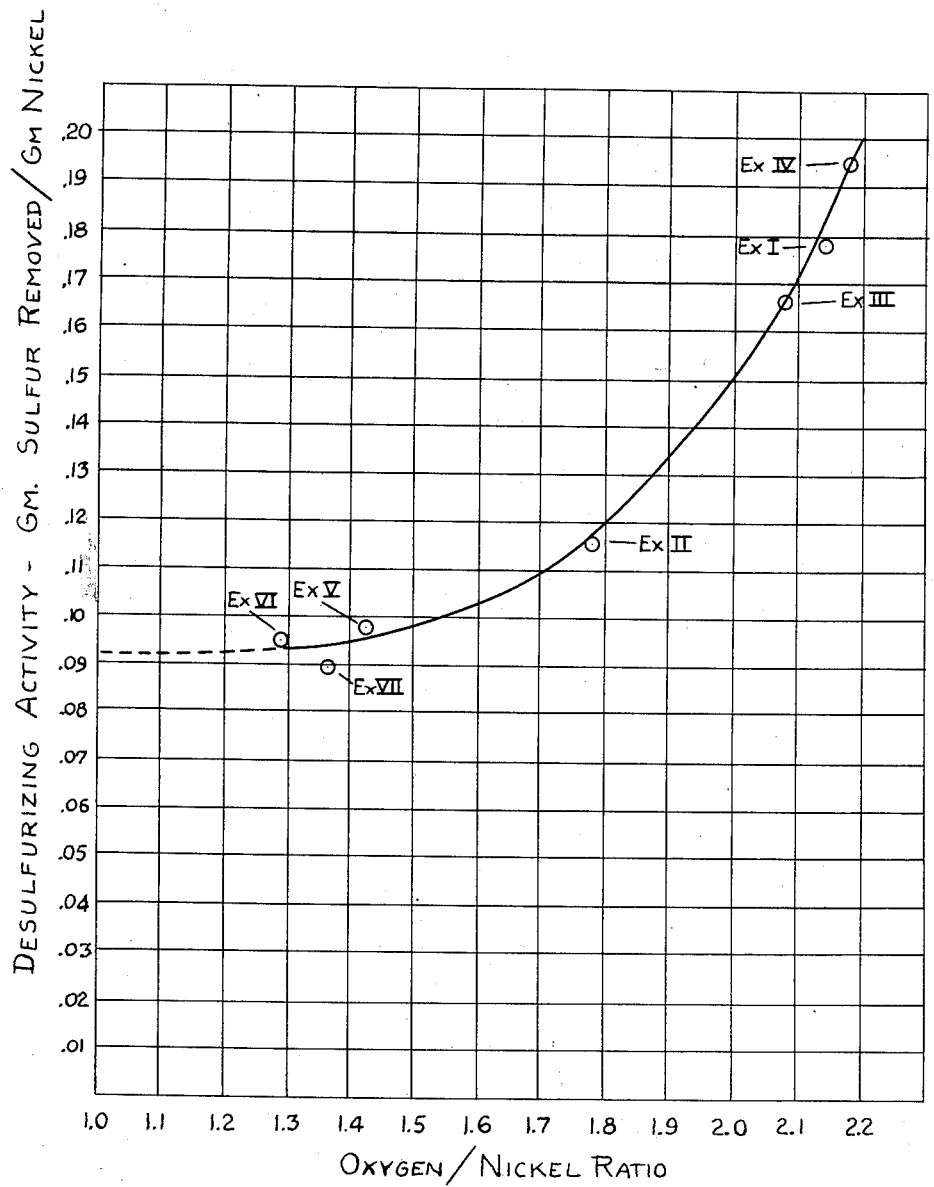

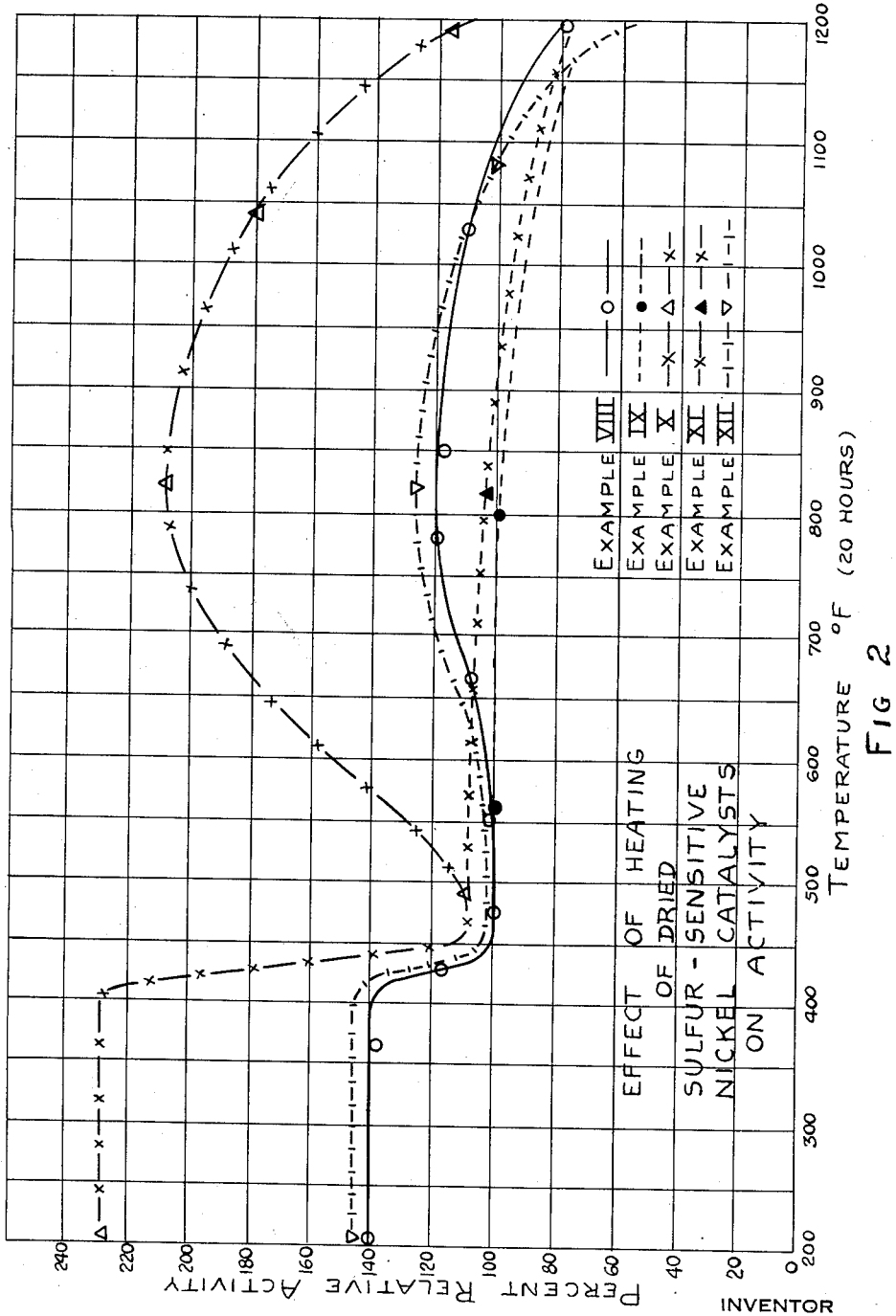

United States Patent Office 2,776,244
Patented Jan. 1, 1957

2,776,244

PREPARATION OF NICKEL OXIDE DESULFURIZING CATALYST AND UTILIZATION THEREOF FOR DESULFURIZING

Elbert O. Sowerwine, Jr., Wapiti, Wyo., assignor to Wigton-Abbott Corporation, Plainfield, N. J., a corporation of New Jersey Application May 11, 1953, Serial No. 353,991

7 Claims. (Cl. 196—28)

This invention relates to nickel catalysts for use in desulfurizing or hydrofining processes and to the preparation and utilization thereof to provide enhanced desulfurization. More particularly the invention relates to new highly active catalytic substances hereinafter referred to as nickel peroxides and to the preparation and utilization of said such nickel peroxides as desulfurizing or hydrofining catalysts.

In the desulfurization or hydrofining of petroleum and other hydrocarbon distillates various catalytic materials have been employed, the most usual being nickel oxide catalysts comprising NiO, $Ni_2O_3$, or mixtures thereof in varying proportions. In preparing and regenerating such nickel oxide catalysts it has been customary to prepare an intermediate such as nickel hydroxide or nickel carbonate and then to roast or calcine the intermediate at temperatures generally within the range of about 450–1200° F. to obtain the oxide. In some instances this has been followed by reduction with hydrogen to obtain metallic nickel catalyst.

I have now discovered that it is possible to prepare new and highly active nickel peroxide catalysts which have a desulfurizing capacity far exceeding the desulfurizing capacity of previously available nickel oxides. These new nickel peroxide catalysts are well suited for use in desulfurizing and hydrofining processes and can readily be prepared by regeneration of spent hydrofining catalysts according to procedures hereinafter described.

While hydrated nickel peroxides have been reported in the literature, as for example, in the form of a component of a fully charged Edison cell, such compounds are highly unstable. In contrast to this my new catalytic substances are anhydrous nickel peroxides which are stable under normal atmospheric conditions and which can be readily handled in the manner required for use in desulfurizing and hydrofining processes.

The presently available nickel oxide catalysts, NiO, $Ni_2O_3$, and mixtures thereof have an atomic ratio of oxygen to nickel falling within the range of 1.0 to 1.5. In my new peroxide catalysts this oxygen to nickel ratio is substantially in excess of 1.5 and preferably within the range of about 1.8 to 2.2 with the activity increasing as the oxygen to nickel ratio increases. It is significant to note that this ratio may be substantially greater than 2, the ratio of a true nickel peroxide of the formula $NiO_2$, since it indicates that the term "nickel peroxide" is here used in a generic rather than in a specific sense. While I do not wish to be limited by a theoretical explanation, it is felt that understanding of the invention will be facilitated by pointing out that the new catalysts are considered to be solid solutions of oxygen in nickel oxide wherein the loosely bound oxygen serves to maintain a desired wide spacing of the nickel atoms in the crystal lattice.

This theoretical explanation is consistent with the fact previously mentioned that my new peroxide catalysts have an oxygen to nickel ratio as high as about 2.2 as compared with 1 to 1.5 for the normal nickel oxides. It also finds support in the procedures required for obtaining the active peroxide catalysts as hereinafter described.

In preparing my nickel peroxide catalyst I preferably start with nickel sulfate which can be obtained in various ways, but is conveniently obtained by known methods from nickel sulfide formed as spent catalyst in desulfurizing and hydrofining processes. A solution of nickel sulfate is reacted with a water soluble inorganic base such for example as an alkaline metal carbonate or hydroxide, under conditions such that a precipitate of the corresponding basic nickel compound is formed while the pH is maintained below pH 9. This precipitate is then dried with care to provide a minimum time temperature effect. This precipitation and drying procedure is fully disclosed and claimed in my co-pending application Serial No. 353,992 filed May 11, 1953. The dried precipitate is then roasted or calcined in a highly oxidizing atmosphere at a temperature of about 750–800° F.

During the precipitation and drying steps, as well as in the calcining step, the material desired for ultimately obtaining the highly active peroxide catalysts appears to be less stable than the material which normally forms in such procedural steps. If the potential characteristics required for an active peroxide catalyst are lost in either the precipitation or drying step, no amount of special care in the calcining step will yield the desired product. On the other hand, if the material has been properly precipitated and dried, special care must still be taken in the calcining step in order to obtain the desired nickel peroxide. It is of primary importance in the calcining step, for example, to have a highly oxidizing atmosphere throughout the mass of heated material. This is best afforded by providing a forced circulation of air or oxygen through the mass being calcined. Furthermore, the calcining must be so conducted as to permit oxygen to replace the water, carbon dioxide, or other volatile materials given off before there can be an appreciable rearrangement of the nickel atoms to a closer lattice spacing. Optimum temperature conditions for calcining fall within a rather narrow range as above mentioned and substantial deviation from this narrow range causes a pronounced reduction in activity of the resulting catalyst.

In the reaction with nickel sulfate to form a basic nickel precipitate I can employ as the precipitating agent hydroxides, carbonates or bicarbonates of the alkali metals, ammonia, and certain of the alkaline earth metals. It is preferable, however, to use an inexpensive material which will form a readily soluble sulfate in the precipitation, such for example as sodium hydroxide or a sodium carbonate. A very satisfactory material for example is trona, a natural sodium sesquicarbonate.

In both the precipitation and the drying steps a minimum time-temperature effect is required in order to retard rearrangement of the nickel atoms. In the precipitation this means bringing together the nickel sulfate and the base by adding a solution of one component to a boiling solution of the other at as rapid a rate as possible until the amount of basic component is from 100 to 101% of the stoichiometric equivalent of the nickel sulfate. This latter control is of primary importance for controlling the final pH since increasing the amount of basic component by as little as 1% (to 102% of the stoichiometric equivalent) will seriously impair the activity of the resulting catalyst, unless care is taken to buffer the mixture to prevent the pH from getting above about pH 9.

Another element of control in the precipitation which affects both the physical form of the catalyst and its activity is the order of combining the components. If nickel sulfate solution is added to a boiling solution of the basic component, the catalyst will be of a coarse granular character, whereas addition of the basic component to a boiling solution of nickel sulfate will yield a catalyst of extremely fine micro crystalline character, which is generally more practical as it can be easily extruded. What is more important, however, is that the latter procedure enables the maintaining of a pH lower than 9 throughout the precipitation, whereas in the former procedure the pH is greater than 9 throughout most of the precipitation and the resulting catalyst is somewhat less active. Even with the proper procedure in adding basic solution to the nickel sulfate solution constant agitation should be provided to prevent local concentrations of basic component from raising the pH above 9 in portions of the reaction mixture.

To retard mobility for rearrangement of the nickel atoms in drying, conditions should be selected which will provide a minimum time-temperature effect. This can be accomplished either by slow low temperature drying at atmospheric pressure (quite impractical for a commercial process) or preferably by rapid drying at elevated temperatures and at pressures which will permit the boiling of water at the temperature employed. Temperatures below about 205° F. at a pressure of about 640 mm. Hg and preferably within the range 150 to 200° F. at correspondingly reduced pressures have been found to be most effective. The further lowering of temperature and pressure is without particular advantage.

It should be noted, however, that in varying the drying conditions two factors should be kept in mind as affecting the catalytic activity and physical properties of the catalyst. The time-temperature function controls the catalytic activity. Rearrangement to the closer nickel to nickel lattice spacing is promoted by higher time-temperature conditions; therefore the minimum time-temperature effect will yield the most active catalyst. The physical properties of the catalyst on the other hand are influenced by the volume rate of gas evolution. Too high an evolution rate although not affecting the molecular structure, may literally explode the gross physical structure and produce a catalyst of extremely small particle size. Such finely divided catalyst can be utilized directly in a fluidized desulfurizing process, but would require pelleting or combining with a carrier for use in desulfurizing with a fixed or moving bed of catalyst. If finely divided catalyst of this type is particularly desired, it can be obtained by either spray drying or vacuum drying, both of which will provide a minimum time-temperature effect and a high rate of gas evolution.

During the drying in the 150–200° F. range a forced circulation of air or an inert gas such as nitrogen having a low relative humidity should be passed through the material to remove water vapors as they are released. In this way the drying time at a moderate temperature can be kept at a minimum.

As previously mentioned, the calcining should be conducted in a highly oxidizing atmosphere and at a temperature preferably within the range of about 750 to 850° F. I have found that in order to obtain the more active nickel peroxide catalysts the oxygen content of the air or the other oxygen containing gas used during calcining is of primary importance. An oxygen concentration of at least 15% and preferably greater than that should be maintained throughout the mass. This means that when using air, which contains only about 20% oxygen, as the oxygen containing gas, a high flow rate of air through the mass being calcined is required in order that portions of the mass may not be in contact with gas containing less than 15% of oxygen. When pure oxygen or air fortified with oxygen is employed as a circulating gas the rate of circulation can, of course, be reduced.

The time of calcining should be sufficient for the necessary decomposition reactions taking place, generally about 20 hours, and continued heating thereafter in the optimum temperature range has little effect. At temperatures above the optimum range, however, the reduction in activity of the catalyst which characterizes too high a temperature is accentuated if heating is continued for a time appreciably beyond that required for the necessary decomposition reactions.

The following examples and the plotted data based thereon as shown in the accompanying drawing are presented to show a number of factors including:

(a) Example I to VII and the plotted data based thereon as shown in Fig. 1 of the drawing demonstrate the comparative oxygen to nickel ratios and desulfurizing activities of peroxide catalysts prepared according to my invention and the normal nickel oxide catalysts.

(b) Examples VIII to XII and the plotted data based thereon as shown in Fig. 2 of the drawing demonstrate the need for proper control in the precipitation, drying and calcining steps for obtainment of the new nickel peroxide catalysts and the effects of deviation from proper conditions on the activity of catalysts obtained. This data has also been disclosed in my co-pending application Serial No. 353,992, filed May 11, 1953, which is directed to the preparation and utilization of basic nickel compounds, such as nickel hydroxide and basic nickel carbonate as desulfurizing or hydrofining catalysts.

In these examples all tests for activity were carried out by a standardized desulfuring procedure wherein a definite weight of the same high sulfur containing oil is recirculated through a definite amount of heated catalyst for a definite time under precisely controlled conditions. In other words the only variable in the test is the sample of catalyst being assayed for desulfurizing activity.

The actual test conditions used in these tests are as follows:

Catalyst sample—An amount containing by assay 7.00 gm. of nickel
Oil stock—Commercial No. 3 straight run distillate from predominately Oregon Basin, Wyoming, crude; high in thiophenes and very resistant for sulfur removal; containing 2.09% by weight of sulfur
Oil quantity charged—420 gm.
Oil recirculation rate—412 gm. per hour
Catalyst temperature—625° F.
Pressure—640 mm. of Hg (slightly superatmospheric at the place of testing)
Rate of feed—2.46 cu. ft. per hour
Exhaust gases—Discharged through ice cooled condenser and pressure regulator
Time of test—6 hours from the time oil first contacts the catalyst
Data to determine—Sulfur content of the oil at the end of the test, from which calculate gm. of sulfur removed per gm. of Ni as a measure of activity In Examples I to VII the atomic ratio of oxygen to nickel is obtained by chemical assay and the desulfurizing activities are obtained directly in terms of grams of sulfur removed per gram of nickel in accordance with the test procedure above described. Examples I to IV are illustrative of nickel peroxide catalysts in accordance with the present invention, Example II being an illustration of a poorly prepared nickel peroxide catalyst. Examples V, VI and VII are illustrations of normal nickel oxide catalysts as commercially available and as calcined by the procedure employed in Examples I to IV.

*Example I*

A solution of nickel sulfate containing 5.28 wt. percent nickel was heated to boiling with diatomaceous earth. Dilute sodium carbonate solution was added slowly with stirring over a two hour period until 1% more than the stoichiometric amount had been added. The precipitate of nickel carbonate was separated quantitively by filtration through a steam jacketed Büchner funnel. The filtrate having a pH of 9.2 showed no nickel content by analysis. The precipitate was dried over night in an oven at 205° F. and at a pressure of 630 mm. of Hg (atmospheric pressure at the 5000 ft.

altitude at which the experiment was conducted). The dry sample was calcined in a 6" x 1" diameter chamber set within a commercial electric laboratory muffle furnace and clean, undried compressed air was passed through the chamber during the calcining period at the rate of 2.0 cu. ft. per hr. (S. T. P.). The calcining was thus continued for 20 hours at 800° F. A portion of this prepared sample containing exactly 7.00 grams of nickel was tested for desulfurizing activity by the procedure above described and found to remove 1.24 grams of sulfur from the 420 grams of test oil giving an activity of .177 (grams of sulfur removed per gram of nickel). The catalyst by analysis had an atomic oxygen to nickel ratio of 2.141.

*Example II*

Using the same sodium carbonate solution and nickel sulfate solution as employed in Example I, the nickel sulfate was added slowly to the sodium carbonate while boiling the latter and agitating the same over a 100 minute period. The diatomaceous earth was added after about 62% of the nickel sulfate solution had been stirred in and the addition of nickel sulfate was stopped at the point where the amount of sodium carbonate was 101% of the stoichiometric amount of added nickel sulfate. The sample was filtered and dried as described in Example I, the nickel-free filtrate having a pH of 8.76. The calcining was done in the same manner as described in Example I, except that the air circulation for the first eight hours was at the rate of 0.20 cu. ft. per hour. During the balance of the 20 hours of calcination at 800° F. the air was circulated at the rate of 2.0 cu. ft. per hour. The calcined product was found by analysis to have an atomic oxygen to nickel ratio of 1.776 and a 7.00 gram sample of the catalyst when tested for desulfurizing activity according to the procedure above described showed the removal of .81 gram of sulfur from the test oil indicating an activity of .116.

*Example III*

The procedure as described in Example I was repeated with the nickel sulfate solution and diatomaceous earth at boiling and with the sodium carbonate solution being added over a 30 minute period with stirring. The boiling and stirring with addition of water to maintain a substantially constant liquid level were continued for an additional one and one-half hours. Filtration and drying were carried out as described in Example I, the filtrate being free of nickel and having a pH of 8.68. The calcination was effected in the manner described in Example I except that the temperature was 806° F. and was continued for 87 hours. The resulting catalyst showed by analysis an atomic oxygen to nickel ratio of 2.070 and a 7.00 gram sample removed 1.17 grams of sulfur from the test oil according to the procedure above described giving a desulfurizing activity of .167.

*Example IV*

The procedure of Example I was repeated with the following changes: The dilute sodium carbonate solution and diatomaceous earth were heated together to boiling and the nickel sulfate solution was added over a 30 minute period with stirring. Boiling and stirring were continued with replacement of water to maintain a substantially constant level for an additional one and one-half hours. Filtering and drying were carried out as described in Example I, the filtrate being nickel-free and having a pH of 8.69. The dried material was calcined for 87 hours at 806° F. with air being circulated at the rate of 2.0 cu. ft. per hour. The calcined product showed by analysis and atomic oxygen to nickel ratio of 2.176. A 7.00 gram sample of the catalyst when subjected to the desulfurization test above described removed 1.36 grams of sulfur from the test oil giving a desulfurizing activity of .194.

*Example V*

A quantity of commercial nickel hydroxide calcined in the same equipment as used in Examples I to IV for 20 hours at a temperature of 800° F. and with circulation of air at the rate of 2.0 cu. ft. per hour. The calcined product showed by analysis an oxygen to nickel ratio of 1.420 and a 7.00 gram sample when subjected to the desulfurization test above described removed .69 gram of sulfur from the test oil giving a desulfurizing activity of .098.

*Example VI*

A sample of commercially obtained nickel oxide catalyst reported to have been calcined at 752° F. in air was found by analysis to have an atomic oxygen to nickel ratio of 1.282. A 7.00 gram sample of this material when subjected to the desulfurization test above described removed .66 gram of sulfur from the test oil giving a desulfurizing activity of .094.

*Example VII*

A sample of commercially obtained basic nickel carbonate was calcined and tested as described in Example V and found to have an atomic oxygen to nickel ratio of about 1.364. A 7.00 gram sample of this material when subjected to the desulfurization test removed .62 gram of sulfur from the test oil giving an activity of .089.

The comparative activities of the catalysts in the foregoing Examples I to VII are plotted in Fig. 1 of the drawing.

In considering the foregoing examples the low activity obtained in Example II can be attributed primarily to the low rate of air circulation during the first eight hours of calcining, and also in particular to the fact that nickel sulfate was added to the basic solution during precipitation which extended over a 100 minute period. During most of this precipitation the pH was substantially in excess of pH 9. The same order of addition was employed in Example IV yielding a markedly higher activity in the resulting catalyst, but in this example it will be noted that the precipitation was effected in a 30 minute period and the calcining was conducted in the presence of an adequate circulation of air. The results in Examples III and IV are affected to some extent by the extended 87 hour calcining period. Both of these materials would have shown greater activity if the calcining had been continued for only 20 hours and on 20 hour calcining the product of Example III would have had greater activity than that of Example IV due to the better pH control during precipitation. A comparison of Examples I to IV with Examples V to VII further serves to demonstrate that the initial precipitation and drying steps are essential to the obtaining of the new nickel peroxide catalysts.

In the following Examples VIII to XII and the plotted curves based thereon, as shown in Fig. 2 of the drawing, the individual activities obtained in the various test runs have been converted to "percent relative activity" using as 100% the activity of commercial basic nickel carbonate calcined in a nitrogen atmosphere (this corresponding closely with the activity of commercially calcined products).

*Example VIII*

Commercial dry basic nickel carbonate was weighed out into 10 samples each containing 7.00 gm. of nickel by analysis. Each was placed one at a time in a 6" x 1" diameter chamber in a laboratory muffle furnace and air preheated to furnace temperature in a coil of tubing within the furnace was passed through the chamber at a rate of 2.0 cu. ft. per hour for exactly 20 hours. Each sample was heated to a different temperature within the range 205–1195° F., and at the end of the 20 hours heating was tested for desulfurizing activity by the method above described giving the following results:

| Sample | Temp., °F. | Percent Relative Activity |
|---|---|---|
| 1 | 205 | 140 |
| 2 | 305 | 138 |
| 3 | 430 | 116 |
| 4 | 475 | 100 |
| 5 | 550 | 101 |
| 6 | 665 | 108 |
| 7 | 780 | 120 |
| 8 | 850 | 118 |
| 9 | 1,030 | 110 |
| 10 | 1,195 | 79 |

*Example IX*

Two samples of the same material as used in Examples VIII were treated in precisely the same manner with the exception that nitrogen instead of air was circulated through the furnace chamber and the temperatures employed were 560 to 800° F., giving the following results:

| Sample | Temp., °F. | Percent Relative Activity |
|---|---|---|
| 1 | 560 | 100 |
| 2 | 800 | 99 |

(These results are taken as the standard or 100% activity in determining percent relative activity in all other tests.)

*Example X*

A quantity of basic nickel carbonate was prepared as follows: A solution of nickel sulfate containing 5.28% by weight of nickel was heated to boiling and dilute sodium carbonate solution was added quickly over a five minute period with vigorous agitation until 1% more than the stoichiometric amount had been added. This mixture was separated into two approximately equal portions, (a) and (b).

Portion (a) was quickly washed and filtered at a near boiling temperature, and the precipitate of basic nickel carbonate was dried quickly in a 205° F. oven with forced air circulation. The barometric pressure was 625 mm. of Hg and the relative humidity of the air was about 10%, making possible quick low temperature drying.

Seven samples of the dried material were weighed out each containing 7.00 gm. of nickel and these were heated and tested for desulfurizing activity as described in Example VIII using temperatures ranging from 205 to 1190° F., giving the following results:

| Sample | Temp., °F. | Percent Relative Activity |
|---|---|---|
| 1 | 205 | 223 |
| 2 | 490 | 109 |
| 3 | 560 | 134 |
| 4 | 665 | 181 |
| 5 | 820 | 208 |
| 6 | 1,040 | 180 |
| 7 | 1,190 | 116 |

*Example XI*

A portion of the dried basic nickel carbonate prepared as described in Example X containing 7.00 gm. of nickel was heated in the manner described in Example VIII, except that nitrogen was circulated through the furnace chamber instead of air. The heating was at 815° F. and after 20 hours the material was tested for desulfurizing activity giving a result of 104 as the percent relative activity. (The temperature of heating was selected as approximately the temperature which gave the highest activity of calcined product in Example X.)

*Example XII*

Portion (b) of the precipitated basic nickel carbonate as obtained in Example X was made alkaline by the addition of an additional 1% over the stoichiometric amount of dilute sodium carbonate and the mixture was digested at boiling for about 18 hours with occasional addition of water to maintain a reasonably constant liquid level. The precipitate was then washed and filtered and dried at 205° F. but without air circulation, and hence at a slower rate than in Example X. From this dried material five samples were weighed out each containing 7.00 gm. of nickel and these were heated at temperatures ranging from 205 to 1080° F. and then tested for activity in the manner described in Example VIII, giving the following results:

| Sample | Temp., °F. | Percent Relative Activity |
|---|---|---|
| 1 | 205 | 145 |
| 2 | 600 | 106 |
| 3 | 700 | 120 |
| 4 | 815 | 127 |
| 5 | 1,080 | 102 |

The foregoing Examples VIII to XII and the plotted results in Fig. 2 of the drawing serve to demonstrate the following facts:

(a) The obtainment of nickel peroxide (shown in Example X) catalyst depends upon first properly precipitating and drying the basic nickel compound, and that commercially available basic nickel carbonate and basic nickel carbonate which has not been properly precipitated (Examples VIII and XI respectively) will yield only the normal oxides on calcining.

(b) In the case of the nickel peroxide, Example X, there is a sharp drop-off of activity as the calcining temperature is varied from the optimum range of about 750 to 850° F. In contrast to this the normal oxides (Examples VIII and XII) show little change in activity throughout a calcining range of about 500 to 1100° F.

(c) Comparison of Examples X and XI show the critical nature of an oxygen atmosphere in the calcining of a properly prepared basic nickel compound. In this connection it will further be noted that activities of products obtained by calcining in an inert atmosphere, Examples IX and XI, do not differ greatly from activities of the normal nickel oxides, whereas in the case of the nickel peroxide Example X, the product obtained in an oxidizing atmosphere is approximately twice as active as a product obtained in an inert atmosphere.

While the foregoing examples have been based on an overall procedure wherein nickel sulfate is precipitated by means of sodium carbonate to form basic nickel carbonate or commercially available nickel carbonate has been employed, it wil be understood that the procedures disclosed in said examples are directly applicable to the preparation of catalysts using other basic compounds as the precipitating agent and going through other basic nickel compounds as intermediates. Thus for example, if nickel sulfate is precipitated with sodium hydroxide and the same precautions are taken in the precipitation, drying and calcining steps, a highly active nickel peroxide catalyst will be obtained. The primary requirement for the basic precipitating agent is that it be a compound which upon reaction with nickel sulfate forms a substantially insoluble basic nickel compound and a readily soluble sulfate.

In summary it should be noted that the following factors are essential for the obtainment of my new nickel peroxide catalysts:

(a) Reaction between nickel sulfate and the alkaline material such as sodium carbonate or sodium hydroxide to precipitate the catalyst should be effected as rapidly as possible while maintaining a pH below 9; as by adding the alkaline material with agitation to a boiling solution of the nickel sulfate.

(b) The amount of alkaline material should be within the range of 100–101% of the stoichiometric amount required to react with the nickel sulfate, or any excess suitably buffered to prevent a final pH in excess of 9.

(c) The resulting precipitate should be dried rapidly at a temperature below about 205° F. and pressure below about 640 mm. of Hg while removing liberated vapors with a forced circulation of a gas such as air or nitrogen which is nonreactive with the catalyst at the temperature employed, or under other (spray or vacuum drying) conditions which will provide a minimum time-temperature effect.

(d) In the calcining step an oxygen containing gas should be circulated through the mass being calcined at such a rate that an oxygen concentration of at least 15% exists throughout the mass and the temperature should be maintained within the range of about 750 to 850° F. for a time merely sufficient to complete the decomposition reactions and preferably for about 20 hours.

Failure to control any one of these essential factors may impair activity in the catalyst. Furthermore, if the initial precipitation is not conducted properly and if, in turn, the drying is not conducted properly no amount of special care in the succeeding steps will yield the highly active nickel peroxide catalysts.

The activity test procedure above described is generally illustrative of the use of my nickel peroxide catalysts in desulfurizing or hydrofining processes. These catalysts can, for example, be utilized in hydrofining processes of the type disclosed in United States patent to Marion H. Gwynn, No. 2,587,149, dated February 26, 1952, and would be distinctly advantageous therein because of their higher desulfurizing activity.

As a further illustration of the utilization of my improved catalysts in desulfurization or hydrofining procedures, however, I submit the following comparative example showing desulfurizing efficiency obtained under identical conditions with a commercially available nickel oxide catalyst and nickel peroxide catalyst prepared in accordance with the process herein disclosed.

*Example XIII*

In a comparative test between catalyst A, a commercial nickel oxide catalyst containing 53.56% nickel and catalyst B, a nickel peroxide catalyst prepared according to the procedure described in Example X with heating or calcining at about 800° F. and containing 51.04% nickel were used to desulfurize a commercial No. 3 oil prepared from predominately Oregon Basin (Wyoming) crude having an initial sulfur content of 2.08% by weight. Quantities of this oil were desulfurized by means of catalysts A and B under the following uniform conditions:

Average reactor temperature _____ 625° F.
Average reactor pressure _____ 12.24 p. s. i. a.
Oil rate _____ 1660 gm./hr.
Gas composition _____ 100% $H_2$.
Quantity of catalyst containing 4221 gm. of Ni.

Oil was contacted with the separate catalysts under the conditions above described and the desulfurized products separately collected and blended until the blended product in each case contained 1.00% by weight of sulfur. The quantities of oil thus treated divided by the weight of nickel in the catalyst gives a measure of the comparative desulfurizing efficiency as follows:

Catalyst:                       Efficiency
A _____ 26.37 gm. oil/gm. Ni.
B _____ 40.19 gm. oil/gm. Ni.

It will be noted that Example X and the plotted data based thereon as shown in Fig. 2 indicates that specially prepared basic nickel carbonate which is disclosed and claimed in my co-pending application above mentioned, shows a somewhat greater desulfurizing activity than the nickel peroxide catalyst. This fact in no way detracts from the practical significance of the invention herein disclosed, since with some types of oil stock and under some hydrofining or desulfurizing conditions it may be undesirable to employ the nickel carbonate due to the possible liberation of carbon dioxide during the hydrofining process. In any such cases the use of nickel peroxide would be of distinct advantage and would lead to results far superior than those obtainable with the normal nickel oxide catalyst.

It is to be understood that my nickel peroxide catalysts can be utilized for desulfurizing or hydrofining either as such, or in admixture with other catalytically active or inert material. In particular it is within the scope of my invention to utilize the catalysts in conjunction with an inert support or carrier, such as kieselguhr or the like.

Various changes and modifications in the procedures herein described may occur to those skilled in the art, and to the extent that such changes and modifications are embraced by the appended claims, it is to be understood that they constitute part of my invention.

I claim:

1. The process for preparing nickel peroxide desulfurizing catalyst of the formula $NiO_x$ where $x$ is a value within the range 1.8 to 2.2 that comprises reacting a solution of nickel sulfate with a basic substance selected from the group consisting of hydroxides and carbonates of ammonia and the alkali metals, as rapidly as possible by adding the basic substance with agitation to the boiling nickel sulfate solution until 100 to 101% of the stoichiometrically required amount of basic substance has been added, while maintaining the reaction mixture at a pH below pH 9, then drying the basic nickel compound thus precipitated under conditions to provide a minimum time-temperature effect, and calcining the dried material by heating at a temperature of about 750–850° F., while circulating an oxygen containing gas through the mass being calcined at such a rate that an atmosphere containing at least 15% oxygen exists throughout the mass, for a time merely sufficient to complete the decomposition reactions.

2. The process as defined in claim 1 wherein calcining is continued for about 20 hours.

3. The process as defined in claim 1 wherein the drying step is conducted by heating in a forced circulation of a non-reacting gas at a temperature below about 205° F. and pressure below about 640 mm. of Hg.

4. The process for preparing a highly active desulfurizing catalyst that comprises reacting a solution of nickel sulfate with a solution of a sodium carbonate as rapidly as possible by adding the sodium carbonate with agitation to the boiling nickel sulfate solution until 100 to 101% of the stoichiometrically required amount of sodium carbonate has been added while maintaining the reaction mixture at a pH below pH 9, rapidly drying the basic nickel carbonate thus obtained by heating in a forced circulation of non-reacting gas at a temperature below about 205° F. and pressure below about 640 mm. of Hg, and calcining the dried material by heating for about 20 hours at a temperature of about 750–850° F. while maintaining throughout the mass being calcined an atmosphere containing at least 15% oxygen for a time merely sufficient to complete the decomposition reactions.

5. The process as defined in claim 4 wherein calcining is continued for about 20 hours.

6. The process as defined in claim 4 wherein the sodium carbonate employed is the naturally occurring sodium sesquicarbonate known as trona.

7. In the desulfurization of sulfur containing hydrocarbon fluids by contacting the same at elevated temperature with a sulfur sensitive catalytic material, the improvement that comprises employing as the catalytic material a nickel peroxide obtained by the process as defined in claim 4 and having the formula $NiO_x$ where $x$ has a value within a range of 1.8 to 2.2.

References Cited in the file of this patent

UNITED STATES PATENTS

| | | |
|---|---|---|
| 1,113,096 | Bosch et al. | Oct. 6, 1914 |
| 2,516,877 | Horne et al. | Aug. 1, 1950 |
| 2,560,433 | Gilbert | July 10, 1951 |
| 2,587,149 | Gwynn | Feb. 26, 1952 |
| 2,646,388 | Crawford et al. | July 21, 1953 |

OTHER REFERENCES

Mellor Text, vol. XV, May 1936, pages 398–400.

Smith et al.: "Polymerization Catalyst of $NiO_2$ and Carbon Black." (Article), Soybean Digest 5, No. 11, pages 43–44 (1945).

Dean, "Nickel Compounds as Catalysts," Industrial and Engineering Chemistry. (Article), pages 985–987, May 1952.